(12) United States Patent
Holden et al.

(10) Patent No.: US 7,635,959 B2
(45) Date of Patent: Dec. 22, 2009

(54) VSD CONTROL

(75) Inventors: Steven J. Holden, Manlius, NY (US);
Vishnu M. Sishtla, Manlius, NY (US);
Cornelius Holmes, North Syracuse, NY (US)

(73) Assignee: Carrier Corporation, Farmington, CT (US)

( * ) Notice: Subject to any disclaimer, the term of this patent is extended or adjusted under 35 U.S.C. 154(b) by 52 days.

(21) Appl. No.: 11/577,837

(22) PCT Filed: Oct. 31, 2005

(86) PCT No.: PCT/US2005/039286

§ 371 (c)(1),
(2), (4) Date: Apr. 24, 2007

(87) PCT Pub. No.: WO2006/050271

PCT Pub. Date: May 11, 2006

(65) Prior Publication Data

US 2008/0187298 A1  Aug. 7, 2008

Related U.S. Application Data

(60) Provisional application No. 60/623,263, filed on Oct. 29, 2004.

(51) Int. Cl.
*H02P 6/12* (2006.01)

(52) U.S. Cl. .................. 318/254; 318/434; 318/721; 318/700

(58) Field of Classification Search .................. 318/119, 318/127, 128, 135, 778, 811, 400.11, 400.32, 318/254, 41, 812, 66, 801, 438, 721, 700; 62/158, 229, 228.4; 363/95, 97, 98
See application file for complete search history.

(56) References Cited

U.S. PATENT DOCUMENTS

| | | | |
|---|---|---|---|
| 4,050,006 A * | 9/1977 | Stich | 363/98 |
| 4,663,942 A | 5/1987 | Kanazawa | |
| 4,724,680 A * | 2/1988 | Kawai | 62/115 |
| 5,604,672 A * | 2/1997 | Yoshida et al. | 363/97 |
| 5,857,349 A * | 1/1999 | Hamaoka et al. | 62/228.4 |
| 5,971,733 A | 10/1999 | Huang | 425/116 |
| 6,014,004 A * | 1/2000 | Hamaoka et al. | 318/778 |
| 6,462,492 B1 * | 10/2002 | Sakamoto et al. | 318/400.32 |
| 6,501,240 B2 * | 12/2002 | Ueda et al. | 318/135 |
| 6,768,284 B2 * | 7/2004 | Lee et al. | 318/808 |
| 6,977,474 B2 * | 12/2005 | Ueda et al. | 318/128 |
| 7,102,306 B2 * | 9/2006 | Hamaoka et al. | 318/400.01 |
| 7,102,903 B2 * | 9/2006 | Nakamura et al. | 363/98 |
| 7,425,806 B2 * | 9/2008 | Schnetzka et al. | 318/41 |
| 2001/0005320 A1 * | 6/2001 | Ueda et al. | 363/95 |
| 2003/0067278 A1 * | 4/2003 | Nakamura et al. | 318/254 |
| 2004/0062062 A1 * | 4/2004 | Lee et al. | 363/37 |
| 2005/0189904 A1 * | 9/2005 | Wills et al. | 318/812 |

* cited by examiner

*Primary Examiner*—Paul Ip
(74) *Attorney, Agent, or Firm*—Bachman & LaPointe, P.C.

(57) ABSTRACT

A compressor is powered by a motor which is, in turn, powered by a variable speed drive (VSD). The switching frequency and voltage/frequency relationship of the VSD may be adjusted dynamically to maximize efficiency.

19 Claims, 2 Drawing Sheets

ND CONTROL

CROSS-REFERENCE TO RELATED APPLICATION

Benefit is claimed of U.S. Patent Application Ser. No. 60/623,263, filed Oct. 29, 2004, and entitled "VSD Control", the disclosure of which is incorporated by reference herein as if set forth at length.

BACKGROUND OF THE INVENTION

This invention relates to motor control. More particularly, the invention relates to control of variable speed drives for compressor motors.

In refrigeration applications, a compressor is used to compress a working fluid (the refrigerant) from initial (suction) conditions to compressed (discharge) conditions. The initial conditions are characterized by a saturated suction temperature (SST) and the discharge conditions are characterized by a saturated discharge temperature (SDT). For a given refrigerant, the compressor (exclusive of the motor powering it) will have a performance envelope dictated by a variety of considerations including efficiency and reliability. This envelope may be approximated by a three dimensional space whose dimensions are SST, SDT, and a third dimension (e.g., a compressor speed or a power parameter) indicative of an output in view of the other two dimensions. Considerations involving the motor and other components will further restrict the system operating envelope within the compressor operating envelope.

An exemplary compressor is powered by a hermetic motor which is, in turn, powered by a variable speed drive (VSD). The VSD supplies a modulated alternating current output having a characteristic output voltage and output frequency. The VSD receives power from a power supply (e.g., 460 VAC, 60 Hz). In a basic VSD, the relationship between output voltage and output frequency is substantially fixed and approximately linear. With such a basic VSD and hermetic motor, the motor speed is a substantially fixed and approximately linear function of drive frequency. In the absence of a variable ratio transmission, the ratio of motor speed to compressor speed will be fixed and may be a simple 1:1 ratio.

The torque required by the compressor (and thus supplied by the motor) will essentially be a function of SDT and SST and will essentially be independent of the third compressor performance envelope parameter. In the basic operation, at given SST and SDT, the motor and compressor speed will be determined by the load (e.g., the air conditioning load). A given motor speed is associated with a proportional frequency position on the drive's fixed voltage/frequency curve (line). At a given point on the voltage/frequency curve, however, the current draw of the drive will accordingly be determined by the SST and SDT values. For example, at a given voltage and frequency, if the SDT were to increase suddenly, the torque would increase at a given speed thus necessitating a power increase from the VSD and, accordingly, a current increase.

Certain VSD's permit selection of the voltage/frequency relationship. These are typically preset when the drive is associated with its motor for a given application.

Operating efficiency has long been a concern in compressor/air conditioning system design.

BRIEF SUMMARY OF THE INVENTION

One aspect of the invention is a method for controlling a variable speed drive supplying pulse width modulated electric power of an output voltage and output frequency to a motor to drive a compressor. The method involves at least one of: dynamically changing an inverter switching frequency in association with changing the output frequency; and within a first portion of a domain of said frequency, operating the drive with a dynamically changing relationship of said voltage to said frequency.

In various implementations, the method may be performed to improve efficiency relative to an essentially constant ratio of said voltage to said frequency and an essentially constant said inverter switching frequency. This may comprise said dynamically changing the inverter switching frequency by at least one of: essentially a step function between at least: a first value of the inverter switching frequency associated with a first range of the output frequency; and a second value of the inverter switching frequency associated with a second range of the output frequency; and a continuous changing of the inverter switching frequency in association with changing the output frequency over a range of the output frequency.

Another aspect of the invention involves a compressor system. A motor is coupled to the compressor to drive the compressor and has a motor speed. A variable speed drive is coupled to the motor to supply the motor with electric power having a voltage and a frequency. Control means are coupled to the variable speed drive and configured to operate the variable speed drive to supply said electric power so as to improve a combined efficiency of the motor and variable speed drive relative above a baseline efficiency associated with an essentially constant inverter switching frequency and an essentially constant ratio of said voltage to said frequency.

In various implementations, in a first range of said speed there may be a substantially linear increase in said voltage with said speed. In a second range of said speed, higher than said first range, said voltage may remain substantially constant. The control means may be configured to supply said electric power in a first range with said frequency increasing substantially linearly with said speed.

Another aspect of the invention involves a method for remanufacturing a variable speed drive and motor combination or reengineering a configuration of said combination from a baseline condition to a second condition. Control hardware or software is coupled to the variable speed drive to operate the variable speed drive to supply said electric power. The control hardware or software is configured so as to improve a combined efficiency of the motor and variable speed drive above a baseline condition efficiency associated with an essentially constant inverter switching frequency and an essentially constant ratio of said voltage to said frequency.

In various implementations, the combined efficiency may be improved relative to the baseline efficiency over at least half a frequency domain of the combination. The combined efficiency may be improved relative to the baseline efficiency over essentially an entire frequency domain of the combination. The second condition may include a non-constant inverter switching frequency and a non-constant ratio of said voltage to said frequency. The second condition may include an inverter switching frequency continuously changing as a function of said frequency; and said voltage being essentially constant over a portion of a domain of said frequency. The second condition may include: an inverter switching frequency changing as a step function of said frequency and having 2-10 switching frequency levels.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

Like reference numbers and designations in the various drawings indicate like elements.

DETAILED DESCRIPTION

Refrigeration system operating efficiencies may reflect inherent efficiencies of the compressor working elements, the motor, and the VSD as well as synergistic efficiencies. If the compressor physical and operating parameters are given, control of motor and VSD operating parameters may be utilized to provide efficient operation. For example, the compressor physical parameters would include the configuration and size of the compressor and the nature of its working fluid. The operating parameters would include the saturated suction temperature (SST) and saturated discharge temperature (SDT) for a target or other operating environment. These values may serve as proxies for suction and discharge pressures. The parameters would also include a capacity (e.g., the flow rate-which will tend to be directly proportional to motor speed).

Figure 1:
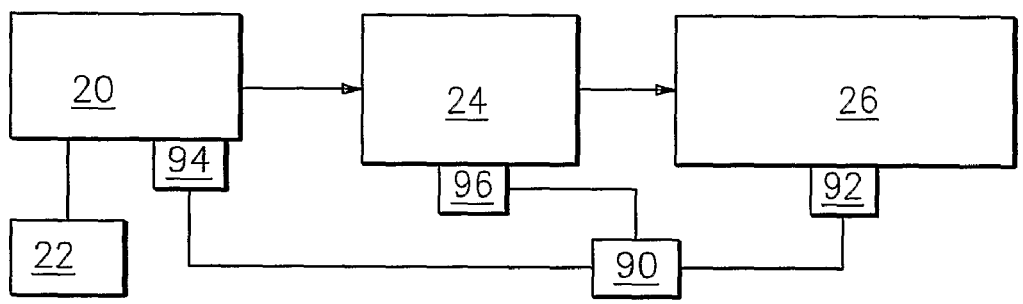
FIG. 1 is a block diagram of a compressor system.

FIG. 1 shows a representative system wherein a VSD 20 draws electrical power from a power supply 22 (e.g., three-phase AC line power at 460V/60 Hz typical of US commercial power). The VSD 20 outputs electrical power to a motor 24 which, in turn, provides mechanical power to drive a compressor 26 (shown separately, but optionally integrated with the motor). The VSD output voltage may be pulse width modulated (PWM) AC (e.g., three phase power of controllable frequency to drive the motor at a motor speed associated with such frequency).

Figure 2:
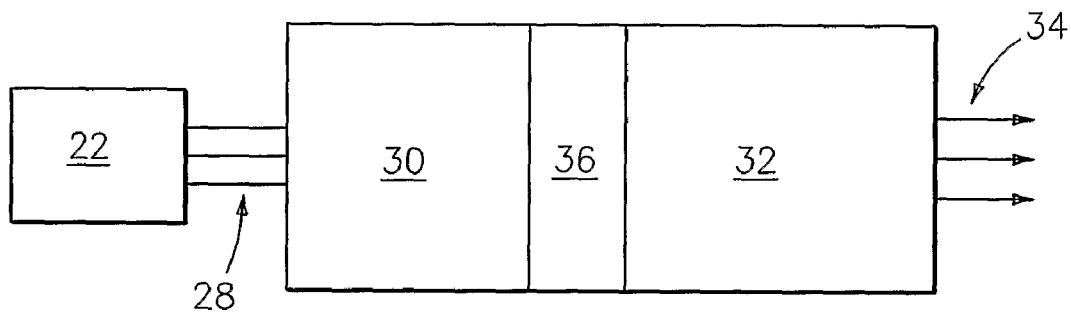
FIG. 2 is a block diagram of a variable speed drive of the system of FIG. 1.

FIG. 2 Shows further details of the VSD 20. The VSD includes a rectifier 30 drawing the input electrical power over lines 28 and outputs a DC power. An inverter 32 receives the DC power and outputs the PWM output power to the motor over output lines 34. A DC storage device 36 may be between the rectifier and inverter to accommodate sags, surges, and other transient delivery or load phenomena.

An exemplary rectifier 30 is a three-phase thyristor rectifier. An exemplary inverter is a three-phase bridge using insulated gate bipolar transistors (IGBT's) with freewheel diodes forming six switches to control the voltage and frequency of the PWM output power.

The inverter is operated at a switching frequency. In the PWM output signal, the duration of the pulses and of the nulls between pulses are integral multiples of t, where t is the inverse of switching frequency. At a given output frequency, a particular switching frequency may minimize the combined inverter and motor losses. Looking to inverter losses, these are at least partially a function of the switching frequency and current draw. Thus, lowering switching frequency may minimize inverter losses. Lowering switching frequency reduces the closeness of the PWU signal to a sine wave and thereby increases the harmonics in the signal. Motor losses are at least partially a function of the harmonics. With higher switching frequencies, harmonics, and thus motor losses may be minimized. These two competing considerations mean that at a given output frequency, there may be an efficiency-maximizing switching frequency (other things being equal). At lower output frequencies, the level of harmonics associated with a given switching frequency is reduced. Thus it may be possible to rebalance motor and inverter losses by lowering/raising switching frequency as output frequency is lowered/raised.

Figure 3:
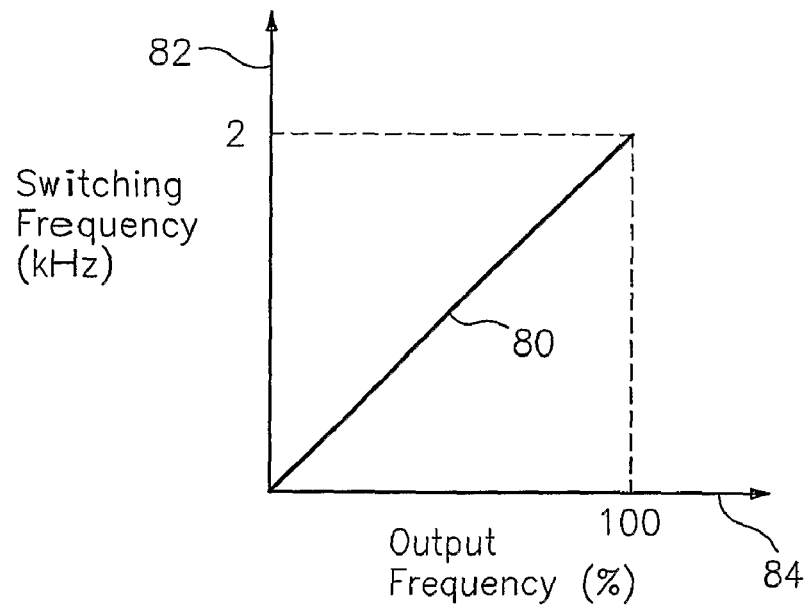
FIG. 3 is a first graph of inverted switching frequency against drive output frequency.
Figure 4:
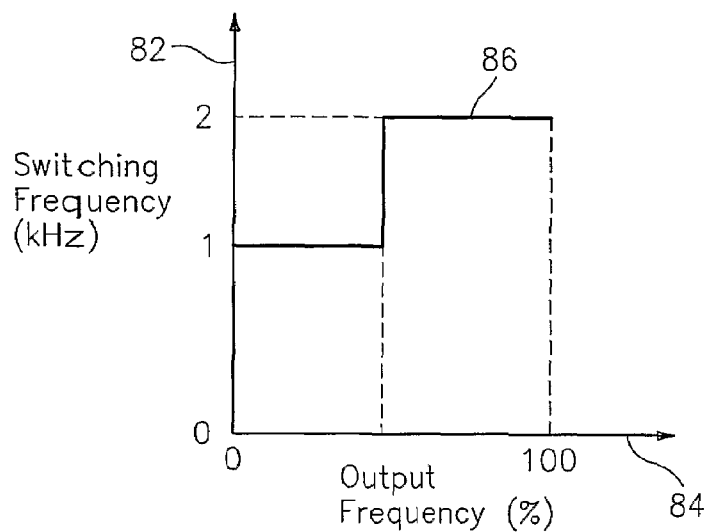
FIG. 4 is a second graph of inverter switching frequency against drive output frequency.

FIG. 3 shows a basic linear relationship 80 between switching frequency 82 (kHz) and output frequency 84 (% of max— e.g., the motor max. and/or the drive max.) to attain greater efficiency than would be obtained at an essentially constant switching frequency. FIG. 4 shows a step function relationship 86 having two levels. More levels are possible and may be used to simulate a linear or non-linear function. An exemplary number of discrete levels is 2-10. Linear or simple step functions may be hardwired into the VSD control circuitry. Yet more complex relationships may be programmed into a controller 90 (FIG. 1, e.g., a microcontroller). These may take other parameters into consideration, including real time data received from various sensors (e.g., temperature sensors 92 determining thermodynamic operating conditions of the compressor and voltage, current, and/or frequency sensors 94 and 96 detecting conditions of the VSD and/or motor).

Figure 5:
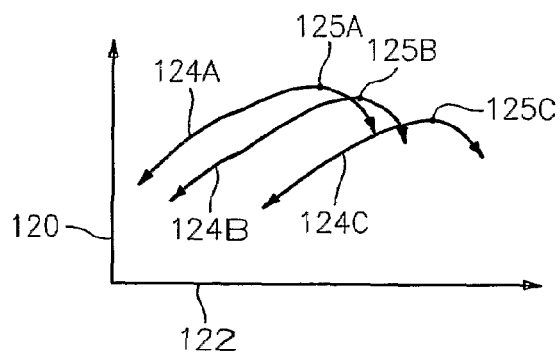
FIG. 5 is a graph of motor efficiency against motor input voltage at several power levels.
Figure 6:
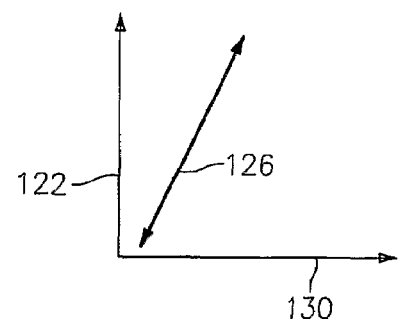
FIG. 6 is a graph of motor input voltage against shaft speed at maximum motor efficiency.

Turning to motor efficiency, FIG. 5 shows a graph of motor efficiency 120 against motor input voltage 122 at a series of exemplary power levels, respectively identified by curves 124A, 124B, and 124C. The curves may be determined by measurements with an actual motor or by estimation or simulation techniques. The maximum of each curve represents the peak efficiency operating condition for the associated power and voltage. For a given compressor, the required motor torque will be a function of the SST and SDT. If these values are fixed, torque will be essentially fixed. If motor torque is fixed then the motor power output is proportional to the motor speed. By using several maxima 125A, 125B, 125C from FIG. 5, one can plot the efficiency-maximizing curve 126 generated (FIG. 6) of motor voltage 122 against the shaft speed 130 associated with a given power output. Curve 126 may be close to a linear relationship between voltage against frequency or drive speed. For the motor, flux density in the motor air gap is proportional to the voltage to frequency ratio. If voltage is increased for a given frequency, the flux density will increase accordingly. Above a critical density, the, the motor stator iron losses increase. For an exemplary motor, an approximate critical density is about 1.4 Tesla. As long as the flux density is below the value, the losses due to flux density do not substantially change.

Figure 7:
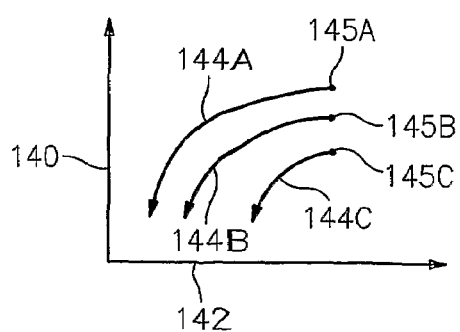
FIG. 7 is a graph of drive efficiency against drive output voltage at maximum drive efficiency.

Returning to the VSD, one can plot drive efficiency 140 against the drive output voltage 142 for various operating conditions. FIG. 7 shows a family of curves 144A, 144B, 144C each representing a constant power condition with power increasing from curve 144A to curve 144C. Terminal points 145A, 145B, 145C identify respective efficiencies at a maximum operating voltage of the drive. Some of the drive losses are characterized by varying directly with the current draw while others vary with the square of current draw. The result is that efficiency increases as current draw decreases. Specifically, it is believed that the principal losses in an inverter fall into two categories: conduction losses and switching losses. Conduction loss is believed to have two components: one that is proportional to current and voltage; and another that is proportional to the square of current and resistance. As the voltage is increased, at a given output frequency and switching frequency, current decreases and hence the inverter conduction losses decrease. The switching losses are also proportional to current and hence will be low at higher voltage. Thus, at a given frequency drive efficiency generally increases with the output voltage.

Figure 8:
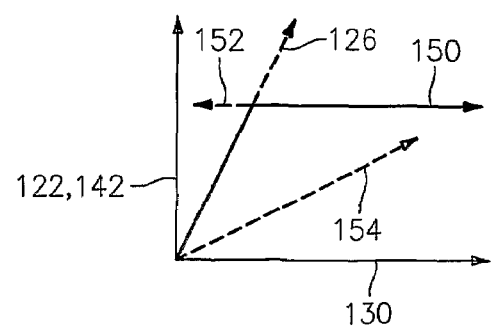
FIG. 8 is a graph of drive output voltage against shaft speed for optimized efficiency conditions.

The drive output voltage is the motor input voltage. FIG. 8 plots motor input/drive output voltage 122, 142 against shaft speed 130. A curve 150 showing possible operating conditions is defined by a low shaft speed portion of the efficiency-maximizing motor voltage curve 126 and a higher shaft speed portion of a curve 152 of the voltage limit of the drive. The curve 152 will reflect the drive topology and may be constant based upon input voltage to the drive. It may reflect both efficiency and reliability/safety considerations By contrast, line 154 shows the normal or default voltage/frequency curve (shaft speed and frequency being essentially related by a constant factor).

Based on the foregoing, a possible operating protocol involves controlling the VSD to operate at voltage at or near the curve 150, maximizing voltage-related motor efficiency subject to drive constraints, while switching frequency is selected to balance associated motor and drive losses.

One or more embodiments of the present invention have been described. Nevertheless, it will be understood that various modifications may be made without departing from the spirit and scope of the invention. For example, the drive/motor control may take into account additional factors beyond those discussed and, thereby, further balance the results achieved. Accordingly, other embodiments are within the scope of the following claims.

What is claimed is:

1. A method for controlling a variable speed drive supplying pulse width modulated electric power of an output voltage and output frequency to a motor to drive a compressor, the method comprising:
dynamically changing an inverter switching frequency in association with changing said output frequency; and
within a first portion of an output frequency domain, operating the drive with a dynamically changing relationship of said output voltage to said output frequency.

2. The method of claim 1 performed to improve efficiency relative to an essentially constant ratio of said output voltage to said output frequency and an essentially constant said inverter switching frequency.

3. The method of claim 1 comprising said dynamically changing the inverter switching frequency by at least one of:
essentially a step function between at least: a first value of the inverter switching frequency associated with a first range of the output frequency; and a second value of the inverter switching frequency associated with a second range of the output frequency; and
a continuous changing of the inverter switching frequency in association with changing the output frequency over a range of the output frequency.

4. The method of claim 1 wherein said supplied electric power is a three-phase AC power.

5. The method of claim 1 comprising said dynamically changing the inverter switching frequency by:
essentially a step function between at least: a first value of the inverter switching frequency associated with a first range of the output frequency; and a second value of the inverter switching frequency associated with a second range of the output frequency.

6. The method of claim 1 comprising said dynamically changing the inverter switching frequency by:
a continuous changing of the inverter switching frequency in association with changing the output frequency over a range of the output frequency.

7. A compressor system comprising:
a compressor;
a motor coupled to the compressor to drive the compressor and having a motor speed;
a variable speed drive coupled to the motor to supply the motor with electric power having a voltage and a frequency; and
a control means coupled to the variable speed drive and configured to operate the variable speed drive to supply said electric power so as to improve a combined efficiency of the motor and variable speed drive relative above a baseline efficiency associated with an essentially constant inverter switching frequency and an essentially constant ratio of said voltage to said frequency, wherein:
the control means is configured to supply said electric power as pulse width modulated electric power via at least one of:
dynamically changing an inverter switching frequency in association with changing the output frequency; and
within a first portion of an output frequency domain, operating the drive with a dynamically changing relationship of said output voltage to said output frequency.

8. The system of claim 7 wherein:
in a first range of said speed there is a substantially linear increase in said voltage with said speed; and
in a second range of said speed, higher than said first range, said voltage remains substantially constant.

9. The system of claim 7 wherein the control means is configured to supply said electric power in a first range with said frequency increasing substantially linearly with said speed.

10. The system of claim 7 wherein:
the control means is configured to supply said electric power as pulse width modulated electric power via:
dynamically changing said inverter switching frequency in association with changing the output frequency; and
within a first portion of said output frequency domain, operating the drive with said dynamically changing relationship of said output voltage to said output frequency.

11. The system of claim 7 wherein the motor is a three-phase AC motor.

12. A method for remanufacturing a variable speed drive and motor combination or reengineering a configuration of said combination from a baseline condition to a second condition comprising:
configuring a control hardware or software coupled to the variable speed drive to operate the variable speed drive to supply electric power having a voltage and a frequency so as to improve a combined efficiency of the motor and variable speed drive above a baseline condition efficiency associated with an essentially constant inverter switching frequency and an essentially constant ratio of said voltage to said frequency, wherein:
the control means is configured to supply said electric power as pulse width modulated electric power via at least one of:
dynamically changing an inverter switching frequency in association with changing the output frequency; and within a first portion of an output frequency domain, operating the drive with a dynamically changing relationship of said output voltage to said output frequency.

13. The method of claim 12 wherein said combined efficiency is improved relative to the baseline efficiency over at least half a frequency domain of the combination.

14. The method of claim 12 wherein said combined efficiency is improved relative to the baseline efficiency over essentially an entire frequency domain of the combination.

15. The method of claim 12 wherein said second condition includes non-constant said inverter switching frequency and a non-constant ratio of said voltage to said frequency.

16. The method of claim 12 wherein said second condition includes:
    said inverter switching frequency continuously changing as a function of said frequency; and
    said voltage being essentially constant over a portion of a domain of said frequency.

17. The method of claim 12 wherein said second condition includes:
    said inverter switching frequency changing as a step function of said frequency and having 2-10 switching frequency levels.

18. The method of claim 12 wherein said second condition includes:
    said inverter switching frequency changing as a step function of said frequency.

19. The method of claim 12 wherein said supplied electric power is a three-phase AC power.

* * * * *